United States Patent
Ishii et al.

(10) Patent No.: US 8,678,340 B2
(45) Date of Patent: Mar. 25, 2014

(54) HYDRAULIC CONTROL VALVE APPARATUS FOR AUTOMATIC TRANSMISSION

(75) Inventors: Hideki Ishii, Numazu (JP); Tomohiro Kameda, Fuji (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 484 days.

(21) Appl. No.: 12/402,090

(22) Filed: Mar. 11, 2009

(65) Prior Publication Data
US 2009/0242056 A1 Oct. 1, 2009

(30) Foreign Application Priority Data

Mar. 31, 2008 (JP) ................................. 2008-092660

(51) Int. Cl.
*F16K 31/12* (2006.01)

(52) U.S. Cl.
USPC ... 251/50; 137/625.65; 137/637; 137/625.67; 137/625.69

(58) Field of Classification Search
USPC .......... 137/637, 625.67, 625.25, 625.69, 884; 251/50

See application file for complete search history.

(56) References Cited

U.S. PATENT DOCUMENTS

| | | | | |
|---|---|---|---|---|
| 3,253,614 A | * | 5/1966 | McCay, Jr. | 137/596 |
| 4,137,944 A | * | 2/1979 | Koch | 137/596 |
| 5,379,874 A | | 1/1995 | Fujita et al. | |
| 6,408,883 B2 | * | 6/2002 | Motoki et al. | 137/625.64 |
| 7,104,273 B1 | * | 9/2006 | Stafford | 137/15.17 |
| 7,390,285 B2 | | 6/2008 | Park et al. | |
| 2006/0169338 A1 | | 8/2006 | Takagi | |
| 2007/0023722 A1 | * | 2/2007 | Oishi | 251/129.15 |
| 2007/0169753 A1 | | 7/2007 | Sato et al. | |

FOREIGN PATENT DOCUMENTS

| | | | |
|---|---|---|---|
| DE | 10 2005 051 828 A1 | 5/2006 | |
| JP | 401242884 | * 9/1989 | ............. F16K 31/06 |
| JP | 6-034024 A | 2/1994 | |

* cited by examiner

*Primary Examiner* — Jason J Boeckmann
*Assistant Examiner* — Joel Zhou
(74) *Attorney, Agent, or Firm* — Foley & Lardner LLP (57) ABSTRACT

A hydraulic control valve apparatus including a valve body and a hydraulic control valve that is disposed in the valve body in parallel to an upper horizontal surface of the valve body. The hydraulic control valve includes a spool, a biasing member that biases the spool, and a damper chamber that accommodates the biasing member. The valve body includes a drain hole through which a pressurized oil is discharged from the hydraulic control valve, and a first communication passage that allows fluid communication between the drain hole of the valve body and the damper chamber of the hydraulic control valve. The drain hole and the first communication passage are formed on the upper horizontal surface of the valve body.

10 Claims, 6 Drawing Sheets

HYDRAULIC CONTROL VALVE APPARATUS FOR AUTOMATIC TRANSMISSION

BACKGROUND OF THE INVENTION

The present invention relates to a hydraulic control valve apparatus for an automatic transmission that is installed in a vehicle.

An automatic transmission that is installed in a vehicle includes a plurality of friction engagement elements such as a clutch and a brake, and a hydraulic control apparatus that controls supply of a pressurized oil to the friction engagement elements. The friction engagement elements are selectively operated to shift between an engagement state and a disengagement state in response to the pressurized oil supplied, so that a gear ratio of the automatic transmission is determined. The hydraulic control apparatus includes a valve body formed with a hydraulic path (or a hydraulic circuit) which is connected to the respective friction engagement elements, and a shift control valve (or a hydraulic control valve) that is mounted to the valve body and operative to open and close the hydraulic path within the valve body so as to control supply a line pressure (or a hydraulic circuit pressure) to the respective friction engagement elements. The shift control valve is usually constituted of a solenoid operated valve. Specifically, the shift control valve includes a pressure regulating portion that includes a sleeve, a spool slidably moveable in the sleeve and a spring that biases the spool, and a solenoid portion including a plunger and a solenoid that electromagnetically drives the plunger. The spool has one end to which a load is applied by the plunger electromagnetically driven, and the other end to which a load is applied by the spring. The shift control valve balances the loads to thereby regulate an input pressure and produce an output pressure corresponding to an input signal, i.e., an electromagnetic force, which is applied to the solenoid portion.

In the hydraulic control apparatus as described above, the valve body may be disposed within an oil pan that is disposed below the automatic transmission. In this case, when the valve body is in an immersed state in which the valve body is immersed in oil within the oil pan, the shift control valve mounted to the valve body is kept in an immersed state in which the shift control valve is immersed in the oil. In the immersed state, a damper chamber of the shift control valve in which the spring is accommodated is always filled with the oil. On the other hand, the valve body may be disposed on a side of the automatic transmission together with the oil pan in order to provide a sufficient space below the automatic transmission and avoid interference with parts such as a drive shaft of wheels and a suspension. Japanese Patent Application First Publication No. 6-34024 indicates such an arrangement of the valve body on the side of the automatic transmission.

SUMMARY OF THE INVENTION

In a case where the shift control valve is disposed on an upper side of the automatic transmission due to limitation in layout, the shift control valve is not always in the immersed state within the oil pan so that the damper chamber is not always filled with the oil. Specifically, when the vehicle is stopped on a slope or an oil level is inclined due to rapid acceleration of the vehicle, the oil flows into the damper chamber and then the oil within the damper chamber flows out through a clearance between the spool and the sleeve while the vehicle is kept in the stopped state for a long time. When an amount of the oil within the damper chamber is changed, there occurs a problem that a characteristic of a damping force that is exerted on the spool varies to thereby cause a variation in hydraulic pressure of the shift control valve. Due to the variation in hydraulic pressure of the shift control valve, alienation between a command pressure and an actual pressure might occur, thereby causing a shift shock upon a shifting operation of the automatic transmission. The shift control valve may be constituted of a hydraulic valve, for instance, a pilot valve that drives a spool by applying a load that is caused by a spring and a load that is caused by a pilot pressure to the spool. Even in a case where the shift control valve is constituted of the hydraulic valve such as the above pilot valve, the same problem as described above will occur.

The present invention has been made in view of the above-described problem. An object of the present invention is to provide a hydraulic control apparatus for an automatic transmission which can stabilize a hydraulic characteristic of a shift control valve even when the shift control valve is not immersed in oil.

In one aspect of the present invention, there is provided a hydraulic control valve apparatus for an automatic transmission in a vehicle, the hydraulic control valve apparatus comprising:

a valve body that is formed with a hydraulic circuit for a pressurized oil and disposed in the vehicle in a horizontal direction; and a hydraulic control valve that is disposed in the valve body in parallel to an upper horizontal surface of the valve body, the hydraulic control valve including a spool, a biasing member that biases the spool, and a damper chamber that accommodates the biasing member, wherein the valve body includes a drain hole through which the pressurized oil is discharged from the hydraulic control valve, and a first communication passage that allows fluid communication between the drain hole of the valve body and the damper chamber of the hydraulic control valve, and the drain hole and the first communication passage are formed on the upper horizontal surface of the valve body.

In a further aspect of the present invention, there is provided a hydraulic control valve apparatus for an automatic transmission in a vehicle, the hydraulic control valve apparatus comprising:

a valve body that is formed with a hydraulic circuit for a pressurized oil and disposed in the vehicle in a horizontal direction;

a shift control valve that is disposed in the valve body in parallel to an upper horizontal surface of the valve body, the shift control valve including a biasing member, a damper chamber that accommodates the spring, and a spool that is biased by the biasing member, the shift control valve being operative to control supply of the pressurized oil to friction engagement elements that are provided in the automatic transmission, and a circuit pressure regulating valve that is disposed in the valve body in parallel to the upper horizontal surface of the valve body, the circuit pressure regulating valve being always supplied with the pressurized oil from a hydraulic pressure source and formed with a drain port through which the pressurized oil supplied from the hydraulic pressure source is drained, wherein the valve body includes a communication passage that allows fluid communication between the drain port of the circuit pressure regulating valve and the damper chamber of the shift control valve, the communication passage being formed on the upper horizontal surface of the valve body.

In a still further aspect of the present invention, there is provided a hydraulic control valve apparatus for an automatic transmission in a vehicle, the hydraulic control valve apparatus comprising:

a valve body that is formed with a valve bore and an input port through which a pressurized oil is introduced into the valve bore, the valve body being disposed in the vehicle in a horizontal direction, a spool that is slidably disposed in the valve bore of the valve body in parallel to an upper horizontal surface of the valve body;

a biasing member that biases the spool; and a damper chamber that is disposed in the valve body and accommodates the biasing member;

wherein the valve body includes a drain hole through which the pressurized oil is discharged from the valve bore and a first communication passage that allows fluid communication between the drain hole and the damper chamber, and the drain hole and the first communication passage are formed on the upper horizontal surface of the valve body so as to open to the upper horizontal surface of the valve body.

DETAILED DESCRIPTION OF THE INVENTION

In the followings, embodiments of the present invention will be described with reference to the accompanying drawings.

First Embodiment

Figure 1:
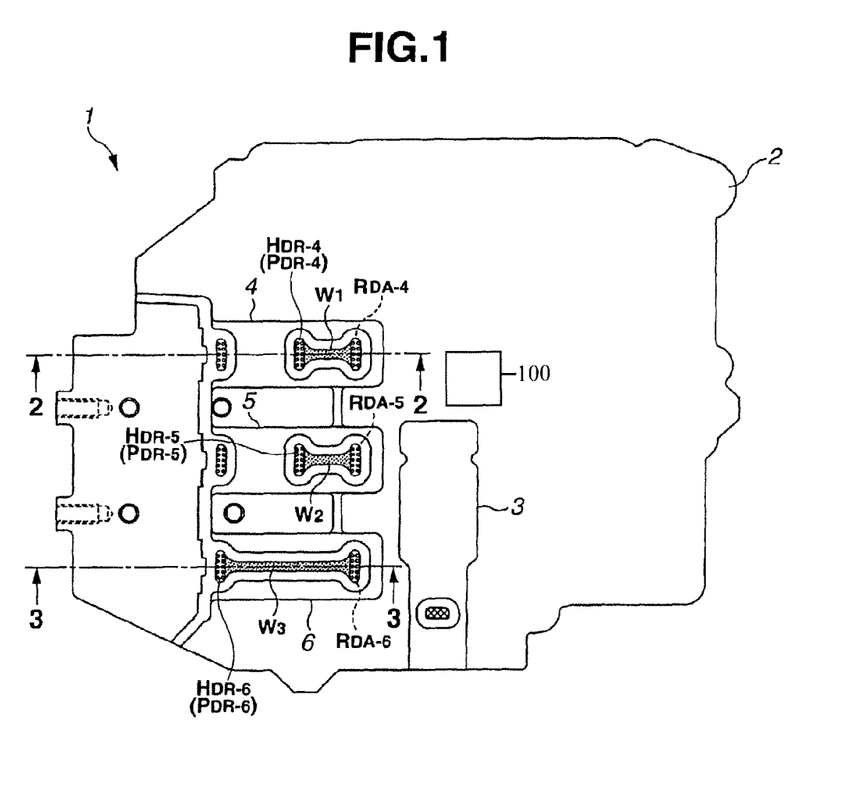
FIG. 1 is a schematic top plan view of a hydraulic control valve apparatus for an automatic transmission, according to a first embodiment of the present invention, showing a valve body of hydraulic control valve apparatus.
Figure 2:
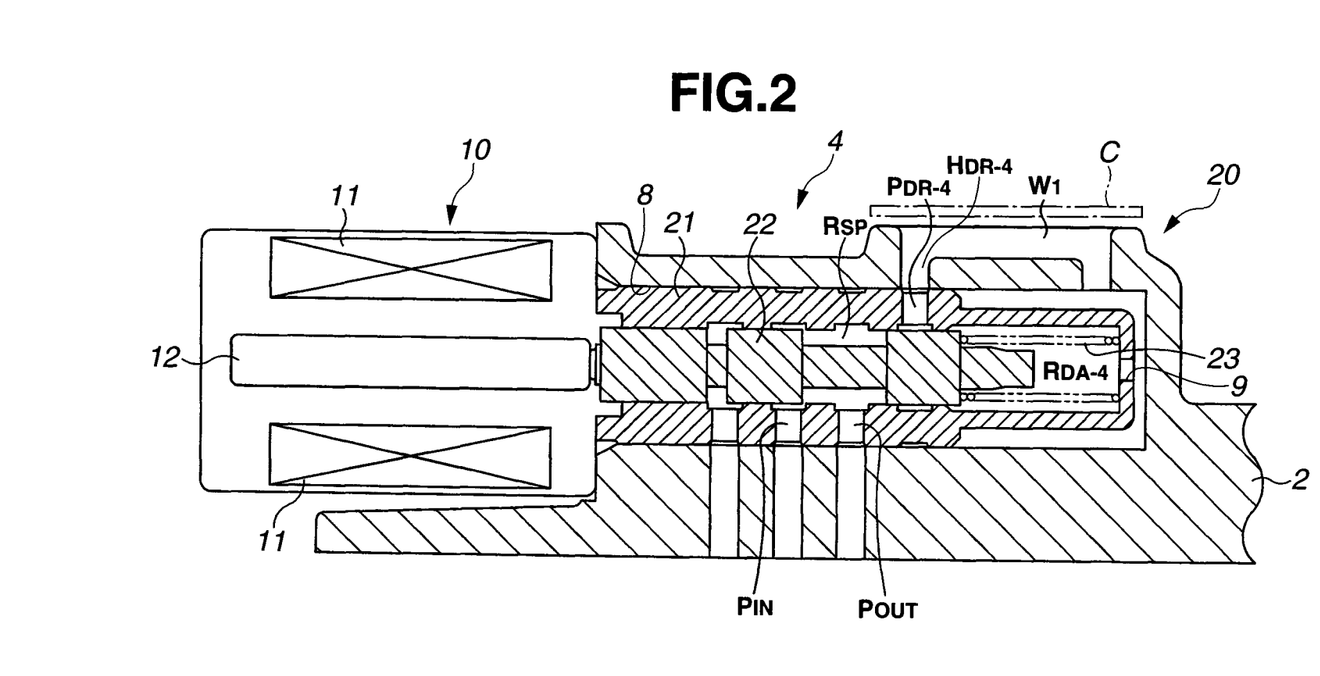
FIG. 2 is a schematic cross-section of the hydraulic control valve apparatus shown in FIG. 1, taken along line 2-2 of FIG. 1.
Figure 3:
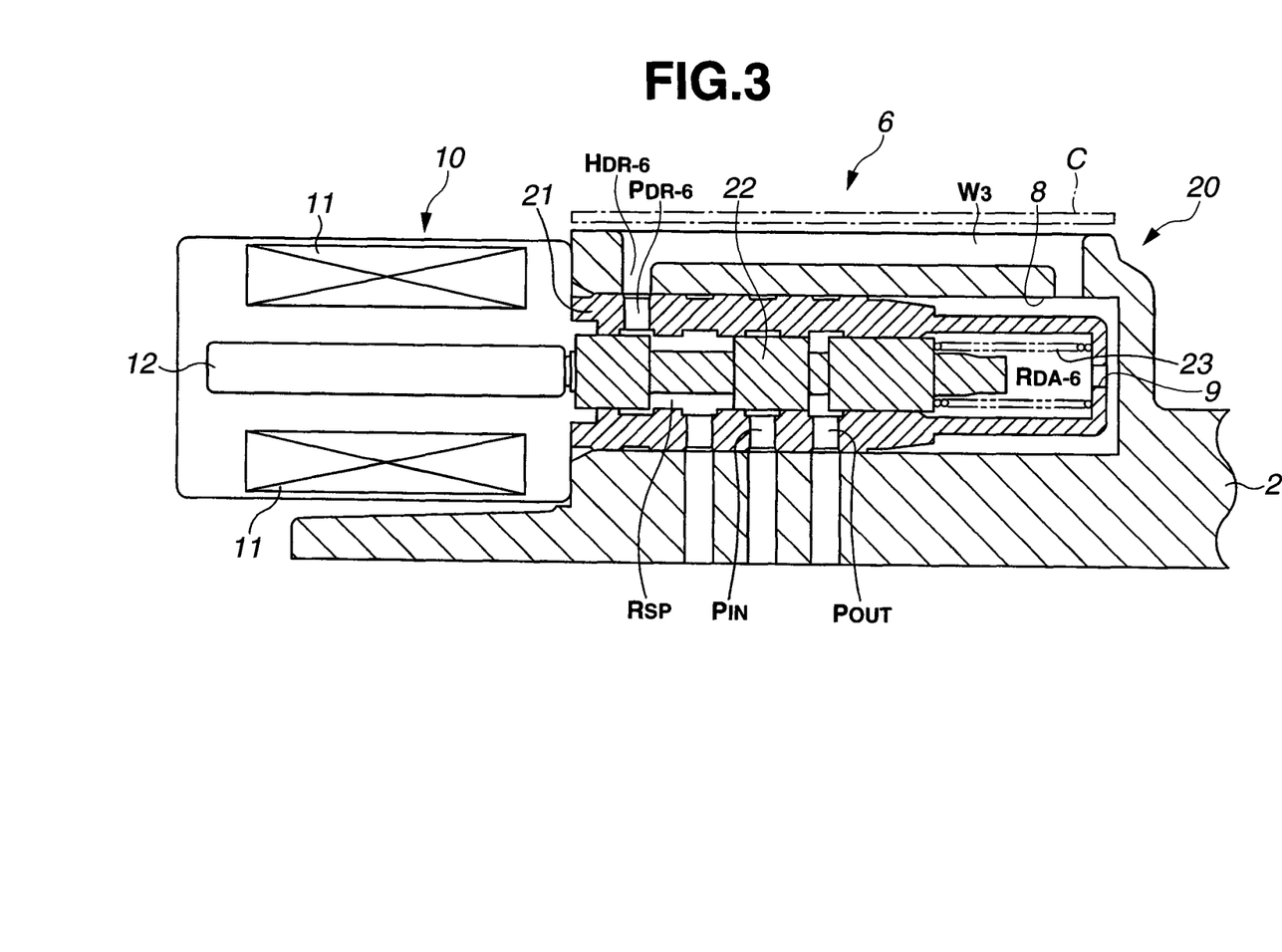
FIG. 3 is a schematic cross-section of the hydraulic control valve apparatus shown in FIG. 1, taken along line 3-3 of FIG. 1.

FIG. 1 to FIG. 3 illustrate a hydraulic control valve apparatus for an automatic transmission, according to a first embodiment of the present invention. FIG. 1 is a top plan view of the hydraulic control valve apparatus and shows a valve body of the hydraulic control valve apparatus. FIG. 2 is a cross-section of a first hydraulic control valve that is disposed in the valve body, taken along line 2-2 of FIG. 1. FIG. 3 is a cross-section of a third hydraulic control valve that is disposed in the valve body, taken along line 3-3 of FIG. 1.

The automatic transmission to which the hydraulic control valve apparatus of this embodiment is applicable is installed in a vehicle. The automatic transmission includes a plurality of friction engagement elements such as a clutch and a brake, and a hydraulic control apparatus that supplies a pressurized oil to the friction engagement elements. The friction engagement elements are operated to selectively shift to an engagement state and a disengagement or release state in response to the pressurized oil supplied. As a result, a gear ratio of the automatic transmission is determined.

Referring to FIG. 1, there is shown hydraulic control apparatus 1 that includes the hydraulic control valve apparatus of this embodiment. Hydraulic control apparatus 1 includes an oil pump as a hydraulic pressure source 100, which is driven by an engine to discharge the pressurized oil. As shown in FIG. 1, hydraulic control apparatus 1 includes valve body 2, pressure regulating valve (circuit pressure regulating valve) 3 disposed in valve body 2, and a plurality of shift control valves (hydraulic control valves) 4 to 6 which are disposed in valve body 2 together with pressure regulating valve 3. Valve body 2 includes an oil supply passage (a supply hydraulic circuit) for supplying the pressurized oil to the respective friction engagement elements, and an oil discharge passage (a discharge hydraulic circuit) for discharging the pressurized oil from the respective friction engagement elements. Pressure regulating valve 3 is operative to adjust a pressure of the pressurized oil discharged from the oil pump to a predetermined line pressure (a predetermined hydraulic circuit pressure). Shift control valves 4 to 6 are formed by solenoid operated valves, respectively, and operative to open and close the oil supply passage and the oil discharge passage and thereby control supply of the pressurized oil to the respective friction engagement elements. The hydraulic control valve apparatus of this embodiment is constituted of valve body 2, pressure regulating valve 3 and shift control valves 4 to 6.

Valve body 2 is disposed laterally, namely, in a horizontal direction, in the vehicle and has an upper horizontal surface, i.e., an outer surface on an upper portion of valve body 2 which extends in the horizontal direction and is exposed to an outside of valve body 2. Each of shift control valves 4 to 6 is arranged substantially parallel to the upper horizontal surface of valve body 2. Shift control valves 4 to 6 are disposed adjacent to each other in a parallel relation in an axial direction thereof. In other words, each of shift control valves 4 to 6 is arranged such that the axial direction thereof is substantially aligned with the horizontal direction.

In this embodiment, shift control valve 4 is a low clutch valve that controls supply of the pressurized oil to a low clutch as a first friction engagement element. Shift control valve 5 is a high clutch valve that controls supply of the pressurized oil to a high clutch as a second friction engagement element. Shift control valve 6 is a brake valve that controls supply of the pressurized oil to a brake as a third friction engagement element. However, shift control valves 4 to 6 are not particularly limited to the above-specified valves, and may be other types of valves which are directly used for changeover of the gear ratio.

Each of shift control valves 4 to 6 includes a solenoid portion that produces an electromagnetic force, and a pressure regulating portion having a spool that is moveable by the electromagnetic force. FIG. 2 and FIG. 3 show a schematic construction of shift control valves 4 and 6, respectively. Shift control valve 5 has a construction similar to that of shift control valve 4. Specifically, as shown in FIG. 2, shift control valve 4 include solenoid portion 10 and pressure regulating portion 20. Solenoid portion 10 includes coil 11 and plunger 12 that is driven to move in an axial direction thereof by energizing coil 11. When coil 11 is energized, a magnetic attraction force is produced and acts on plunger 12 so as to slidably move spool 22 of pressure regulating portion 20 in an axial direction of spool 22. Solenoid portion 10 is disposed on a recessed portion that is formed on the upper horizontal surface of valve body 2.

As shown in FIG. 2, pressure regulating portion 20 includes sleeve 21 that serves as a housing, spool 22 that is slidably disposed in sleeve 21 and serves as a valve element, and spring 23 that has one end connected to spool 22 and serves as a biasing member for spool 22. Sleeve 21 is disposed within valve bore 8 that is formed in valve body 2. Sleeve 21 is formed into a generally cylindrical shape having a small-diameter portion and a large-diameter portion, and has a bottom wall formed with through-hole 9 and a cylindrical side wall connected with the bottom wall. Sleeve 21 includes damper chamber $R_{DA-4}$ that accommodates spring 23, and spool chamber $R_{SP}$ that guides spool 22 in slide-contact with spool 22. Damper chamber $R_{DA-4}$ is defined between the cylindrical side wall of the small-diameter portion of sleeve 21, the bottom wall of sleeve 21, and one axial end portion of spool 22. Spool chamber $R_{SP}$ is defined by the cylindrical side wall of the large-diameter portion of sleeve 21. Sleeve 21 further includes input port $P_{IN}$ through which the pressurized oil is inputted, output port $P_{OUT}$ through which the pressurized oil after being regulated is outputted, and drain port $P_{DR-4}$ through which the pressurized oil is drained. Input port $P_{IN}$, output port $P_{OUT}$ and drain port $P_{DR-4}$ are formed in the circumferential side wall of the large-diameter portion of sleeve 21 so as to communicate with spool chamber $R_{SP}$. That is, input port $P_{IN}$, output port $P_{OUT}$ and drain port $P_{DR-4}$ penetrate the circumferential side wall of sleeve 21 to be opened to an inner circumferential surface and an outer circumferential surface of the circumferential wall of the large-diameter portion of sleeve 21. Input port $P_{IN}$ and output port $P_{OUT}$ are respectively connected to the oil supply passage and the oil discharge passage which are formed in valve body 2. Drain port $P_{DR-4}$ is connected to damper chamber $R_{DA-4}$ through communication passage $W_1$ as explained later.

Spool 22 is formed into a generally cylindrical shape and has the one axial end portion to which spring 23 is mounted and the other axial end portion to which plunger 12 is mounted. The magnetic attraction force of solenoid portion 10 acts on the other end of spool 22 upon energizing coil 11, while a biasing force of spring 23 always acts on the one end of spool 22. Thus, spool 22 undergoes both of the biasing force of spring 23 and the magnetic attraction force of solenoid portion 10 which are applied to the axial ends in opposite directions. Spool 22 is slidably guided in the axial direction within spool chamber $R_{SP}$ of sleeve 21 to open and close respective ports $P_{IN}$, $P_{OUT}$ and $P_{DR-4}$ depending on the balance between the biasing force of spring 23 and the magnetic attraction force of solenoid portion 10.

As shown in FIG. 1 and FIG. 2, valve body 2 has on the upper horizontal surface, drain hole $H_{DR-4}$ and communication passage $W_1$ that is communicated with drain hole $H_{DR-4}$ and allows fluid communication between damper chamber $R_{DA-4}$ and drain port $P_{DR-4}$ of shift control valve 4. Drain hole $H_{DR-4}$ and communication passage $W_1$ are opened to the upper horizontal surface of valve body 2. Communication passage $W_1$ extends in the axial direction of shift control valve 4 and has an opening that is located in a position spaced from drain hole $H_{DR-4}$ and opened to valve bore 8 of valve body 2. In FIG. 1, communication passage $W_1$ is indicated by dotting for the sake of easy distinction.

Similar to shift control valve 4, shift control valve 5 includes solenoid portion 10 and pressure regulating portion 20. Pressure regulating portion 20 of shift control valve 5 includes damper chamber $R_{DA-5}$ and drain port $P_{DR-5}$ which are formed in sleeve 21. As shown in FIG. 1, damper chamber $R_{DA-5}$ and drain port $P_{DR-5}$ are fluidly communicated with each other through communication passage $W_2$. Drain hole $H_{DR-5}$ and communication passage $W_2$ are formed on the upper horizontal surface of valve body 2 so as to be opened to the upper horizontal surface of valve body 2.

As shown in FIG. 1 and FIG. 3, shift control valve 6 has substantially the same construction as that of shift control valve 4 except that shift control valve 6 has a larger axial length than that of shift control valve 4 and communication passage $W_3$ is longer than communication passage $W_1$. Shift control valve 6 includes solenoid portion 10 and pressure regulating portion 20. Sleeve 21 of pressure regulating portion 20 includes damper chamber $R_{DA-6}$, spool chamber $R_{SP}$, input port $P_{IN}$, output port $P_{OUT}$, and drain port $P_{DR-6}$. Valve body 2 has on the upper horizontal surface, drain hole $H_{DR-6}$ and communication passage $W_3$ that is communicated with drain hole $H_{DR-6}$ and allows fluid communication between damper chamber $R_{DA-6}$ and drain port $P_{DR-6}$ of shift control valve 4. Drain hole $H_{DR-6}$ and communication passage $W_3$ are opened to the upper horizontal surface of valve body 2.

The hydraulic control valve apparatus of this embodiment has the following function and effect. Even in a case where shift control valves 4 to 6 are not immersed in oil due to limitation in layout in the automatic transmission, the pressurized oil drained from drain ports $P_{DR-4}$ to $P_{DR-6}$ can be supplied to damper chambers $R_{DA-4}$ to $R_{DA-6}$ through drain holes $H_{DR-4}$ to $H_{DR-6}$ and communication passages $W_1$ to $W_3$ and then reserved within damper chambers $R_{DA-4}$ to $R_{DA-6}$. As a result, hydraulic characteristics of shift control valves 4 to 6 can be stabilized to thereby suppress occurrence of a shift shock that might be caused due to alienation between a command pressure to be inputted to shift control valves 4 to 6 and an actual pressure of shift control valves 4 to 6.

Further, in the hydraulic control valve apparatus of this embodiment, it is not necessary to arrange shift control valves 4 to 6 in oil. This serves for increasing freedom of design of valve body 2. If communication passages or grooves that allow fluid communication between damper chambers $R_{DA-4}$ to $R_{DA-6}$ and drain ports $P_{DR-4}$ to $P_{DR-6}$ are formed within spool 22, the oil in damper chambers $R_{DA-4}$ to $R_{DA-6}$ may be eventually leaked out from drain ports $P_{DR-4}$ to $P_{DR-6}$ when fluid communication between input port $P_{IN}$ and drain ports $P_{DR-4}$ to $P_{DR-6}$ is restrained upon stopping pressure regulation or inputting a maximum pressure command. In addition, in a case where valve body 2 has a stacked structure which includes a plurality of divided valve bodies, for instance, an upper valve body and a lower valve body, which are joined with each other, and a separate plate disposed between the divided valve bodies, there occurs a large limitation to layout of such communication passages or grooves in the separate plate because other complicated oil passages must be formed in the separate plate. In contrast, in the hydraulic control valve apparatus of this embodiment, communication passages $W_1$ to $W_3$ are formed in valve body 2 so that the oil in damper chambers $R_{DA-4}$ to $R_{DA-6}$ can be prevented from leaking out from damper chambers $R_{DA-4}$ to $R_{DA-6}$. As a result, limitation in layout of communication passages $W_1$ to $W_3$ can be reduced and the above-described problems can be eliminated.

Further, since communication passages $W_1$ to $W_3$ respectively allow fluid communication between damper chambers $R_{DA-4}$ to $R_{DA-6}$ and drain ports $P_{DR-4}$ to $P_{DR-6}$, communication passages $W_1$ to $W_3$ can be provided by simply forming grooves respectively linearly extending on the upper horizontal surface of the upper portion of valve body 2 which is located above adjacent to shift control valves 4 to 6 and defines valve bore 8. As a result, it is possible to reduce a length of communication passages $W_1$ to $W_3$ and increase an efficiency of a machining work of forming communication passages $W_1$ to $W_3$ in valve body 2, thereby serving for reducing the production cost.

In particular, in a case where valve body 2 is made of casting, a mold for valve body 2 can be formed such that communication passages $W_1$ to $W_3$ are formed together with valve body 2. The efficiency of the machining work can be increased to thereby further reducing the production cost.

Further, since each of shift control valves 4 to 6 includes sleeve 21 as the housing, drain holes $H_{DR-4}$ to $H_{DR-6}$ and communication passages $W_1$ to $W_3$ are formed in valve body 2, and spool chamber $R_{SP}$ and drain ports $P_{DR-4}$ to $P_{DR-6}$ are formed in sleeve 21 that is provided separately from valve body 2.

Second Embodiment

Figure 4:
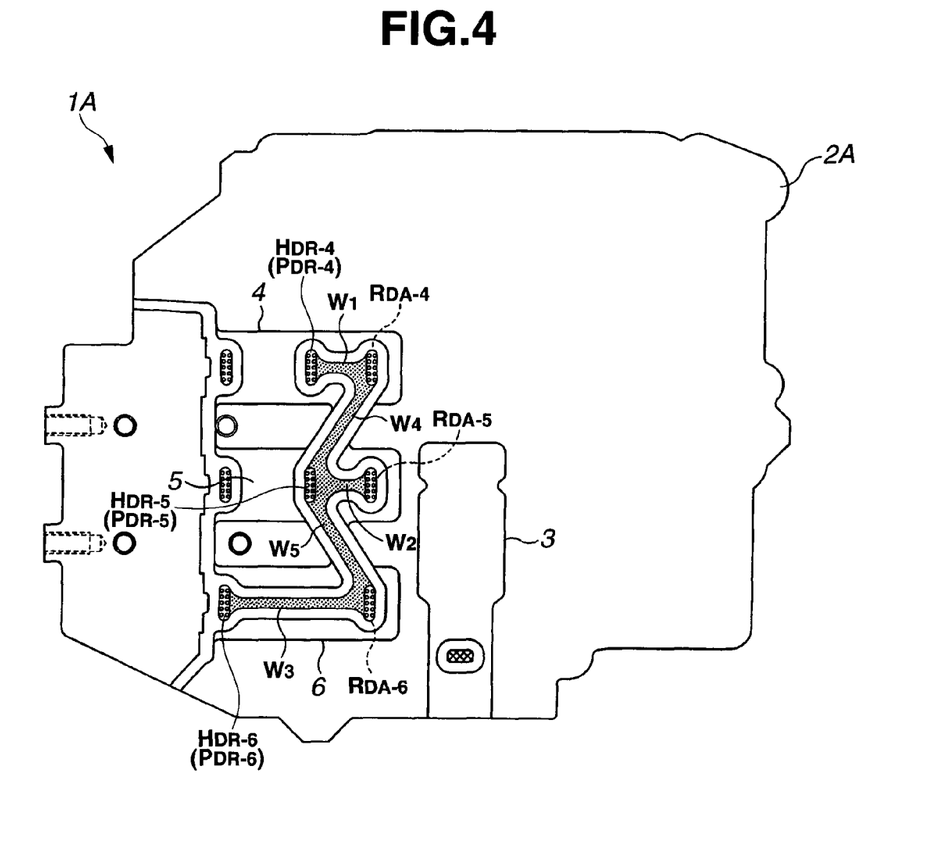
FIG. 4 is a schematic plan view of a hydraulic control valve apparatus for an automatic transmission, according to a second embodiment of the present invention, showing a valve body of hydraulic control valve apparatus.

Referring to FIG. 4, a second embodiment of the hydraulic control valve apparatus will be explained hereinafter, which differs from the first embodiment in that there are provided additional communication passages in addition to communication passages $W_1$ to $W_3$ in the first embodiment. The additional communication passages respectively allows fluid communication between the drain port of one of adjacent two of the shift control valves and the damper chamber of the other of the adjacent two of the shift control valves. FIG. 4 is a top plan view of the hydraulic control valve apparatus of the second embodiment and shows a valve body of the hydraulic control valve apparatus of the second embodiment. Like reference numerals and letters denote like parts, and therefore, detailed explanations therefor are omitted.

As shown in FIG. 4, hydraulic control apparatus 1A includes the hydraulic control valve apparatus of the second embodiment that includes valve body 2A and communication passages $W_4$ and $W_5$ in addition to communication passages $W_1$ to $W_3$. Communication passages $W_1$ to $W_3$ are the same as those described above in the first embodiment. Communication passages $W_4$ and $W_5$ are formed on an upper horizontal surface, i.e., an outer surface on an upper portion of valve body 2A which extends in the horizontal direction and is exposed to an outside of valve body 2A. Communication passages $W_4$ and $W_5$ allow fluid communication between the drain port of one of the adjacent two of shift control valves 4 to 6 and the damper chamber of the other of the adjacent two of shift control valves 4 to 6, respectively. Specifically, communication passage $W_4$ allows fluid communication between drain port $P_{DR-5}$ of shift control valve 5 and damper chamber $R_{DA-4}$ of shift control valve 4 adjacent to shift control valve 5. Communication passage $W_5$ allows fluid communication between drain port $P_{DR-5}$ of shift control valve 5 and damper chamber $R_{DA-6}$ of shift control valve 6 adjacent to shift control valve 5.

That is, in the second embodiment, in the arrangement of shift control valves 4 to 6 adjacent to each other, drain port $P_{DR-5}$ of shift control valve 5 as one of the adjacent two of shift control valves 4 to 6 is communicated with each of damper chambers $R_{DA-4}$ and $R_{DA-6}$ of shift control valves 4 and 6 as the other of the adjacent two of shift control valves 4 to 6, through communication passages $W_4$ and $W_5$. Other structural features of the second embodiment are the same as those of the first embodiment.

The hydraulic control valve apparatus of the second embodiment has the following function and effect. There are provided communication passages $W_4$ and $W_5$ which allow fluid communication between drain port $P_{DR-5}$ of shift control valve 5 as one of the adjacent two of shift control valves 4 to 6 and each of damper chambers $R_{DA-4}$ and $R_{DA-6}$ of shift control valves 4 and 6 as the other of the adjacent two of shift control valves 4 to 6. With the provision of communication passages $W_4$ and $W_5$, even when shift control valves 4 and 6 are not in the driven state, damper chambers $R_{DA-4}$ and $R_{DA-6}$ of shift control valves 4 and 6 can be supplied with the oil from drain port $P_{DR-5}$ of shift control valve 5 by driving shift control valve 5. Therefore, the pressurized oil can be stably reserved in damper chambers $R_{DA-4}$ and $R_{DA-6}$ of shift control valves 4 and 6.

Further, in a case where the damper chamber and the drain port of the shift control valve are arranged at a relatively large distance therebetween as compared to a distance between the damper chamber of the shift control valve and the drain port of the adjacent shift control valve, the damper chamber of the shift control valve can be communicated with the drain port of the adjacent shift control valve through a communication passage therebetween. As a result, a length of the communication passage can be reduced to thereby reduce the cost of the machining work of forming communication passage. Further, preferably, shift control valve 5 as one of the adjacent two of shift control valves 4 to 6 is operative to always receive the pressurized oil as an initial pressure which is discharged from the oil pump, and adjust a pressure of the pressurized oil received to a predetermined value. In this case, the pressurized oil is supplied to shift control valve 5 from the time of engine startup. Therefore, even when shift control valves 4 and 6 as the other of the adjacent two of shift control valves 4 to 6 are in a non-driven state, the pressurized oil can be surely reserved in damper chambers $R_{DA-4}$ and $R_{DA-6}$ of shift control valves 4 and 6 from the time of engine startup. As a result, the hydraulic characteristics of shift control valves 4 and 6 can be stabilized from the time of engine startup.

Furthermore, shift control valve 5 as the one of the adjacent two of shift control valves 4 to 6 may also be constructed to receive a pressurized oil with a reduced pressure as an initial pressure which is attained by reducing a pressure of the oil discharged from the oil pump by flowing through a pressure reducing valve, and adjust the reduced pressure of the pressurized oil to a predetermined value. That is, shift control valve 5 may be constructed to always receive a pressurized oil at the input port during the time period when the oil pump is in the driven state.

Third Embodiment

Figure 5:
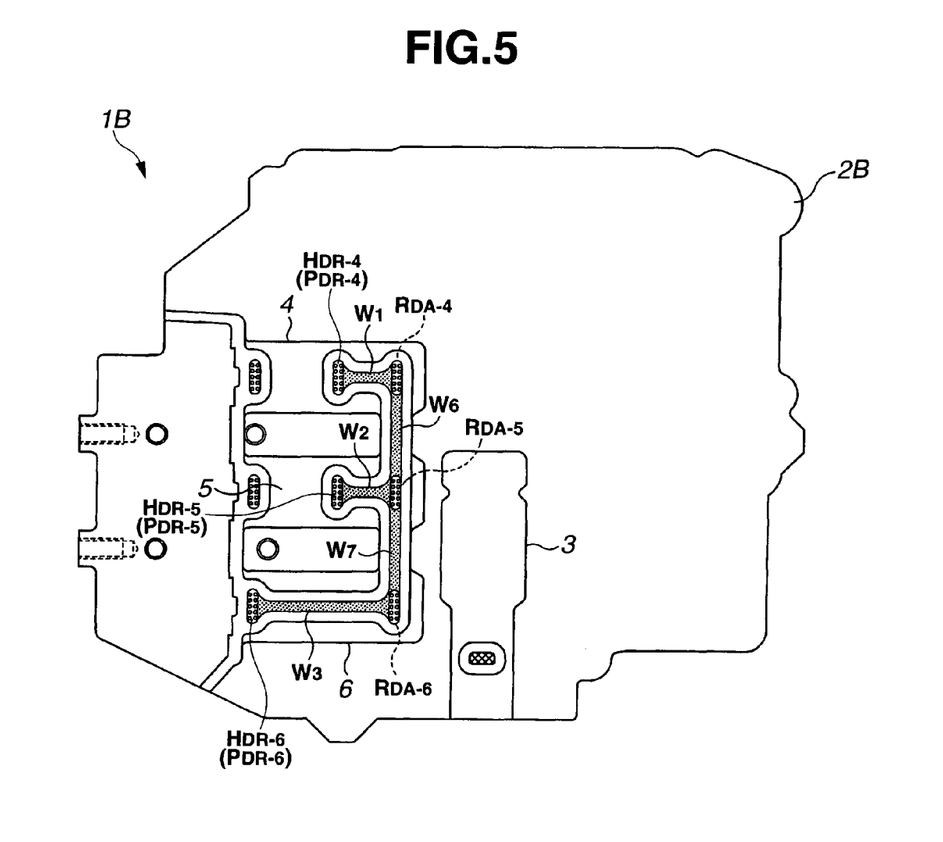
FIG. 5 is schematic plan view of a hydraulic control valve apparatus for an automatic transmission, according to a third embodiment of the present invention, showing a valve body of hydraulic control valve apparatus.

Referring to FIG. 5, a third embodiment of the hydraulic control valve apparatus will be explained hereinafter, which differs from the first embodiment in that there are provided additional communication passages in addition to communication passages $W_1$ to $W_3$ in the first embodiment. The additional communication passages respectively allow fluid communication between the damper chamber of one of the adjacent two of the shift control valves and the damper chamber of the other of the adjacent two of the shift control valves. FIG. 5 is a top plan view of the hydraulic control valve apparatus of the third embodiment and shows a valve body of the hydraulic control valve apparatus of the third embodiment. Like reference numerals and letters denote like parts, and therefore, detailed explanations therefor are omitted.

As shown in FIG. 5, hydraulic control apparatus 1B includes the hydraulic control valve apparatus of the third embodiment which includes valve body 2B and communication passages $W_6$ and $W_7$ in addition to communication passages $W_1$ to $W_3$. Communication passages $W_6$ and $W_7$ are formed on an upper horizontal surface, i.e., an outer surface on an upper portion of valve body 2B which extends in the horizontal direction and is exposed to an outside of valve body 2B. Communication passages $W_6$ and $W_7$ allow fluid communication between damper chamber $R_{DA-5}$ of shift control valve 5 as one of the adjacent two of shift control valves 4 to 6 and each of damper chambers $R_{DA-4}$ and $R_{DA-6}$ of shift control valves 4 and 6 as the other of the adjacent two of shift control valves 4 to 6. Specifically, communication passage $W_6$ allows fluid communication between damper chamber $R_{DA-5}$ of shift control valve 5 and damper chamber $R_{DA-4}$ of shift control valve 4 adjacent to shift control valve 5. Communication passage $W_7$ allows fluid communication between damper chamber $R_{DA-5}$ of shift control valve 5 and damper chamber $R_{DA-6}$ of shift control valve 6 adjacent to shift control valve 5.

That is, in the third embodiment, in the arrangement of shift control valves 4 to 6 adjacent to each other, damper chamber $R_{DA-5}$ of shift control valve 5 as one of the adjacent two of shift control valves 4 to 6 is communicated with each of damper chambers $R_{DA-4}$ and $R_{DA-6}$ of shift control valves 4 and 6 as the other of the adjacent two of shift control valves 4 to 6, through communication passages $W_6$ and $W_7$. Other structural features of the third embodiment are the same as those of the first embodiment.

The hydraulic control valve apparatus of the third embodiment has the following function and effect.

There are provided communication passages $W_6$ and $W_7$ which allow fluid communication between damper chamber $R_{DA-5}$ of shift control valve 5 as one of the adjacent two of shift control valves 4 to 6 and each of damper chambers $R_{DA-4}$ and $R_{DA-6}$ of shift control valves 4 and 6 as the other of the adjacent two of shift control valves 4 to 6. With the provision of communication passages $W_6$ and $W_7$, even when shift control valves 4 and 6 are in a non-driven state, damper chambers $R_{DA-4}$ and $R_{DA-6}$ of shift control valves 4 and 6 can be supplied with the oil from damper chamber $R_{DA-5}$ of shift control valve 5 by driving shift control valve 5. Therefore, it is possible to ensure stable reserving of the oil in damper chambers $R_{DA-4}$ and $R_{DA-6}$ of shift control valves 4 and 6.

In the third embodiment, preferably, shift control valve 5 as the one of the adjacent two of shift control valves 4 to 6 is constructed to receive a pressurized oil discharged from the oil pump as an initial pressure or a pressurized oil with a reduced pressure as an initial pressure which is attained by reducing from a pressure of the oil discharged from the oil pump by flowing through a pressure reducing valve, and adjust the discharged pressure or the reduced pressure of the pressurized oil to a predetermined value. That is, shift control valve 5 may be constructed to always receive a pressurized oil at the input port during the time period when the oil pump is in the driven state. In this case, the pressurized oil is supplied to shift control valve 5 from the time of engine startup. Therefore, even when shift control valves 4 and 6 are in a non-driven state, the pressurized oil can be surely reserved in damper chambers $R_{DA-4}$ and $R_{DA-6}$ of shift control valves 4 and 6 from the time of engine startup. As a result, the hydraulic characteristics of shift control valves 4 and 6 can be stabilized from the time of engine startup.

Fourth Embodiment

Figure 6:
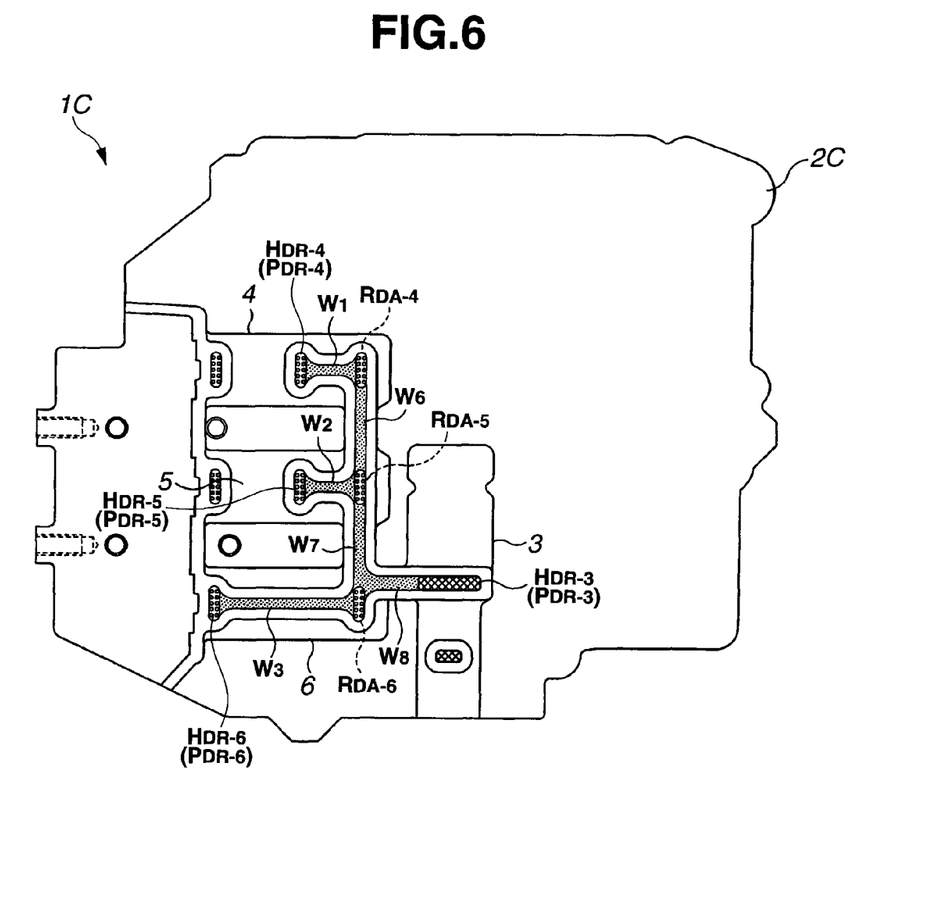
FIG. 6 is schematic plan view of a hydraulic control valve apparatus for an automatic transmission, according to a fourth embodiment of the present invention, showing a valve body of hydraulic control valve apparatus.

Referring to FIG. 6, a fourth embodiment of the hydraulic control valve apparatus will be explained hereinafter, which differs from the third embodiment in that there is provided an additional communication passage in addition to communication passages $W_1$ to $W_3$, $W_6$ and $W_7$ in the third embodiment. The additional communication passage allows fluid communication between the drain port of the pressure regulating valve and the damper chamber of one of shift control valves 4 to 6. FIG. 6 is a top plan view of the hydraulic control valve apparatus of the fourth embodiment and shows a valve body of the hydraulic control valve apparatus of the fourth embodiment. Like reference numerals and letters denote like parts, and therefore, detailed explanations therefor are omitted.

As shown in FIG. 6, hydraulic control apparatus 1C includes the hydraulic control valve apparatus of the fourth embodiment which includes valve body 2C and communication passage $W_8$ in addition to communication passages $W_1$ to $W_3$, $W_6$ and $W_7$. Communication passage $W_8$ is formed on an upper horizontal surface, i.e., an outer surface on an upper portion of valve body 2C which extends in the horizontal direction and is exposed to an outside of valve body 2C. Communication passage $W_8$ allows fluid communication between drain port $P_{DR-3}$ of pressure regulating valve 3 and damper chamber $R_{DA-6}$ of shift control valve 6.

As described above, pressure regulating valve 3 is operative to adjust a pressure of the pressurized oil discharged from the oil pump to a predetermined line pressure. Specifically, pressure regulating valve 3 is operative to always receive the pressurized oil discharged from the oil pump and discharge the pressurized oil from drain port $P_{DR-3}$. Pressure regulating valve 3 is disposed in the vicinity of shift control valves 4 to 6 and arranged on the upper horizontal surface of valve body 2C parallel to the upper horizontal surface of valve body 2C. That is, pressure regulating valve 3 is arranged such that an axial direction of pressure regulating valve 3 is substantially aligned with the horizontal direction. Other structural features of the fourth embodiment are the same as those of the third embodiment.

The hydraulic control valve apparatus of the fourth embodiment has the following function and effect. With the provision of communication passage $W_8$ that allows fluid communication between drain port $P_{DR-3}$ of pressure regulator valve 3 and damper chamber $R_{DA-6}$ of shift control valve 6, the pressurized oil that is discharged from drain port $P_{DR-3}$ of pressure regulator valve 3 is always supplied to damper chamber $R_{DA-6}$ of shift control valve 6 through communication passage $W_8$ and then supplied to damper chamber $R_{DA-5}$ of shift control valve 5 through communication passage $W_7$ and damper chamber $R_{DA-4}$ of shift control valve 4 through communication passage $W_6$. The pressurized oil, therefore, is surely reserved in damper chambers $R_{DA-4}$, $R_{DA-5}$ and damper chamber $R_{DA-6}$ so that the hydraulic characteristics of shift control valves 4 to 6 can be stabilized.

Alternatively, drain port $P_{DR-3}$ of pressure regulator valve 3 can be fluidly communicated with damper chamber $R_{DA-4}$ of shift control valve 4 or damper chamber $R_{DA-5}$ of shift control valve 5 through a communication passage between drain port $P_{DR-3}$ and damper chamber $R_{DA-4}$ or a communication passage between drain port $P_{DR-3}$ and damper chamber $R_{DA-5}$, instead of being communicated with damper chamber $R_{DA-6}$ of shift control valve 6. Further, pressure regulator valve 3 can be replaced by any other circuit pressure regulating valve such as a pilot pressure regulating valve (not shown) or a torque converter regulator valve (not shown), which always receives a pressurized oil from the oil pump and is not directly used for changeover of the gear ratio. Further, in this embodiment, communication passages $W_1$ to $W_3$ that respectively allow fluid communication between damper chambers $R_{DA-4}$ to $R_{DA-6}$ and drain ports $P_{DR-4}$ to $P_{DR-6}$, communication passage $W_6$ that allow fluid communication between damper chamber $R_{DA-4}$ of shift control valve 4 and damper chamber $R_{DA-5}$ of shift control valve 5, and communication passage $W_7$ that allow fluid communication between damper chamber $R_{DA-5}$ of shift control valve 5 and damper chamber $R_{DA-6}$ of shift control valve 6 are not necessarily formed on valve body 2C.

That is, at least one communication passage, i.e., communication passage $W_8$ in this embodiment, which allows fluid communication between a drain port of the circuit pressure regulating valve such as the pilot pressure regulating valve, i.e., drain port $P_{DR-3}$ of pressure regulating valve 3 in this embodiment, and one of damper chambers of the shift control valves, i.e., one of damper chambers $R_{DA-4}$, $R_{DA-5}$ and $R_{DA-6}$ of shift control valves 4 to 6 in this embodiment, can be formed on valve body 2C.

Although the invention has been described above by reference to embodiments of the invention, the invention is not limited to the embodiments described above. Modifications and variations of the embodiments described above will occur to those skilled in the art in light of the above teachings.

For example, in the first to fourth embodiment, a cover plate (or a cover) can be disposed above communication passages $W_1$ to $W_8$ so as to cover communication passages $W_1$ to $W_8$. The cover plate is indicated at C by chain line in FIG. 2 and FIG. 3. With the arrangement of the cover plate, communication passages $W_1$ to $W_8$ can be avoided from entry of contamination. Further, the number of the shift control valves is not limited to three as explained in the above embodiments and at least two shift control valves can be provided.

Further, although the solenoid operated valve that serves as respective shift control valves 4 to 6 includes sleeve 21 in which spool chamber $R_{SP}$ is formed in the first to fourth embodiments, sleeve 21 can be omitted from solenoid operated valves 4 to 6. In this case, spool chamber $R_{SP}$ can be directly formed in valve body 2, 2A, 2B or 2C, and drain port $P_{DR-4}$, $P_{DR-5}$ or $P_{DR-6}$ can be formed in valve body 2, 2A, 2B or 2C and serve as drain hole $H_{DR-4}$, $H_{DR-5}$ or $H_{DR-6}$.

Furthermore, shift control valves 4 to 6 are not limited to the solenoid operated valve as explained in the first to fourth embodiments and can be provided as a pilot valve in which a spool undergoes a pilot pressure and a biasing force of a spring accommodated in a damper chamber.

This application is based on a prior Japanese Patent Application No. 2008-092660 filed on Mar. 31, 2008. The entire contents of the Japanese Patent Application No. 2008-092660 is hereby incorporated by reference.

The scope of the invention is defined with reference to the following claims.

What is claimed is:

1. A hydraulic control valve apparatus for an automatic transmission in a vehicle, the hydraulic control valve apparatus comprising:
   a valve body that is formed with a hydraulic circuit for a pressurized oil and disposed in the vehicle in a horizontal direction; and
   a hydraulic control valve that is disposed in the valve body in parallel to an upper horizontal surface of the valve body, the hydraulic control valve including a spool, a biasing member that biases the spool, a damper chamber that accommodates the biasing member, a housing in which the spool is accommodated and slidably guided, and a drain port formed in the housing so as to discharge the pressurized oil,
   wherein the valve body includes a drain hole through which the pressurized oil is discharged from the hydraulic control valve, and a first communication passage that supplies the discharged oil from the drain hole of the valve body to the damper chamber of the hydraulic control valve, and the drain hole and the first communication passage are formed on the upper horizontal surface of the valve body,
   wherein the first communication passage allows fluid communication between the drain port of the hydraulic control valve and the damper chamber of the hydraulic control valve through the drain hole of the valve body, and
   wherein the first communication passage is in the form of a horizontally extending groove that is open to the upper horizontal surface of the valve body.

2. The hydraulic control valve apparatus as claimed in claim 1, wherein the hydraulic control valve comprises a plurality of hydraulic control valves which are disposed adjacent to each other in the valve body, and the valve body is formed with a second communication passage that supplies the discharged oil from the drain port of one of adjacent two of the hydraulic control valves to the damper chamber of the other of the adjacent two of the hydraulic control valves.

3. The hydraulic control valve apparatus as claimed in claim 1, wherein the hydraulic control valve comprises a plurality of hydraulic control valves which are disposed adjacent to each other in the valve body, and the valve body is formed with a second communication passage that supplies the discharged oil from the damper chamber of one of adjacent two of the hydraulic control valves which is in a driven state to the damper chamber of the other of the adjacent two of the hydraulic control valves which is a non-driven state.

4. The hydraulic control valve apparatus as claimed in claim 2, wherein when a hydraulic pressure source is driven to discharge the pressurized oil, the one of the adjacent hydraulic control valves is operative to always receive the pressurized oil to be discharged from the hydraulic pressure source and adjust a pressure of the received pressurized oil to a predetermined value.

5. The hydraulic control valve apparatus as claimed in claim 1, wherein the hydraulic control valve is a solenoid operated shift control valve that controls supply of the pressurized oil to friction engagement elements which are provided in the automatic transmission,
   the hydraulic control valve apparatus further comprises a circuit pressure regulating valve that is disposed in the valve body in parallel to the upper horizontal surface of the valve body, the circuit pressure regulating valve being always supplied with the pressurized oil from a hydraulic pressure source and formed with a drain port through which the pressurized oil is drained, and
   the valve body is formed with a second communication passage that supplies the discharged oil from the drain port of the circuit pressure regulating valve to the damper chamber of the shift control valve.

6. A hydraulic control valve apparatus for an automatic transmission in a vehicle, the hydraulic control valve apparatus comprising:
   a valve body that is formed with a hydraulic circuit for a pressurized oil and disposed in the vehicle in a horizontal direction;
   a shift control valve that is disposed in the valve body in parallel to an upper horizontal surface of the valve body, the shift control valve including a biasing member, a damper chamber that accommodates the biasing member, a spool that is biased by the biasing member, and a housing in which the spool is accommodated and slidably guided, the shift control valve being operative to control supply of the pressurized oil to friction engagement elements that are provided in the automatic transmission, and a circuit pressure regulating valve that is disposed in the valve body in parallel to the upper horizontal surface of the valve body, the circuit pressure regulating valve being always supplied with the pressurized oil from a hydraulic pressure source and formed with a drain port through which the pressurized oil supplied from the hydraulic pressure source is drained, wherein the valve body includes a communication passage that supplies the drained oil from the drain port of the circuit pressure regulating valve to the damper chamber of the shift control valve, the communication passage being formed on the upper horizontal surface of the valve body, and wherein the communication passage is in the form of a horizontally extending groove that is open to the upper horizontal surface of the valve body.

7. The hydraulic control valve apparatus as claimed in claim 1, further comprising a cover that is disposed above the first communication passage so as to cover the first communication passage.

8. The hydraulic control valve apparatus as claimed in claim 6, further comprising a cover that is disposed above the communication passage so as to cover the communication passage.

9. A hydraulic control valve apparatus for an automatic transmission in a vehicle, the hydraulic control valve apparatus comprising:

a valve body that is formed with a valve bore and an input port through which a pressurized oil is introduced into the valve bore, the valve body being disposed in the vehicle in a horizontal direction, a housing disposed within the valve bore of the valve body in parallel to an upper horizontal surface of the valve body;

a spool that is slidably disposed in the housing;

a biasing member that biases the spool; and a damper chamber that is disposed in the valve body and accommodates the biasing member;

wherein the valve body includes a first drain hole through which the pressurized oil is discharged from the valve bore and a first communication passage that supplies the discharged oil from the first drain hole to the damper chamber, the first drain hole and the first communication passage are formed on the upper horizontal surface of the valve body, and the first communication passage is in the form of a horizontally extending groove that is open to the upper horizontal surface of the valve body, wherein the valve body further comprises a second drain hole through which a pressurized oil to be always supplied from a hydraulic pressure source is drained, and a second communication passage that supplies the drained oil from the second drain hole to the damper chamber, the second drain hole and the second communication passage being formed on the upper horizontal surface of the valve body, and the second communication passage is in the form of a horizontally extending groove that is open to the upper horizontal surface of the valve body.

10. The hydraulic control valve apparatus as claimed in claim 9, further comprising a cover that is disposed above the second communication passage so as to cover the second communication passage.

* * * * *